US009463995B2

(12) United States Patent
Bernard et al.

(10) Patent No.: US 9,463,995 B2
(45) Date of Patent: Oct. 11, 2016

(54) REFRACTORY ALLOY AND MINERAL WOOL PRODUCTION METHOD

(75) Inventors: Jean-Luc Bernard, Clermont (FR); Christophe Liebaut, Saint-Jean de Vaux (FR); Patrice Berthod, Pont a Mousson (FR); Sylvain Michon, Chalon sur Saone (FR)

(73) Assignees: SAINT-GOBAIN ISOVER, Courbevoie (FR); SAINT-GOBAIN SEVA, Chalon sur Saone (FR)

( * ) Notice: Subject to any disclaimer, the term of this patent is extended or adjusted under 35 U.S.C. 154(b) by 986 days.

(21) Appl. No.: 10/580,839

(22) PCT Filed: Nov. 26, 2004

(86) PCT No.: PCT/FR2004/050621
§ 371 (c)(1),
(2), (4) Date: Dec. 19, 2006

(87) PCT Pub. No.: WO2005/052208
PCT Pub. Date: Jun. 9, 2005

(65) Prior Publication Data
US 2007/0107811 A1    May 17, 2007

(30) Foreign Application Priority Data
Nov. 26, 2003 (FR) .................................. 03 13890

(51) Int. Cl.
*C03B 37/04* (2006.01)
*C22C 19/07* (2006.01)
*C22F 1/10* (2006.01)

(52) U.S. Cl.
CPC .............. *C03B 37/047* (2013.01); *C22C 19/07* (2013.01); *C22F 1/10* (2013.01)

(58) Field of Classification Search
CPC ....... C22F 1/10; C22C 45/008; C22C 19/07; C03B 37/047
USPC .......................................................... 65/457
See application file for complete search history.

(56) References Cited

U.S. PATENT DOCUMENTS

| 3,980,473 A | * | 9/1976 | Costin .............................. 65/515 |
| 4,084,964 A | | 4/1978 | Grant et al. |
| 4,481,034 A | | 11/1984 | Grant et al. |
| 6,068,814 A | | 5/2000 | Kang et al. |
| 6,266,979 B1 | | 7/2001 | Johnson et al. |

FOREIGN PATENT DOCUMENTS

| GB | 669 588 | | 4/1952 |
| JP | 52105526 A | * | 9/1977 |
| JP | 06 240392 | | 8/1994 |
| JP | 06240392 A | * | 8/1994 |
| JP | 09-157780 | | 6/1997 |
| JP | 09 157780 | | 6/1997 |
| JP | 09157780 A | * | 6/1997 |
| JP | 52-105526 | | 9/1977 |
| WO | 99/16919 | | 4/1999 |
| WO | 01/90429 | | 11/2001 |

OTHER PUBLICATIONS

U.S. Appl. No. 12/744,496, filed May 25, 2010, Bernard, et al.

* cited by examiner

*Primary Examiner* — Weiping Zhu
(74) *Attorney, Agent, or Firm* — Oblon, McClelland, Maier & Neustadt, L.L.P.

(57) ABSTRACT

The invention relates to an alloy having high temperature mechanical strength in an oxidizing medium and comprising a carbide-precipitation-strengthened matrix containing chromium. The invention is characterized in that the alloy comprises carbides of at least one metal (M) selected from among titanium, zirconium and hafnium, said carbides also optionally containing (M') tantalum. The invention is suitable for articles that require high temperature mechanical strength, such as for hot glass processing or production.

22 Claims, 2 Drawing Sheets

REFRACTORY ALLOY AND MINERAL WOOL PRODUCTION METHOD

The present invention relates to a metal alloy for use at very high temperature, especially one that can be used in a process for manufacturing mineral wool by fiberizing a molten mineral composition, or more generally for the production of tools endowed with high-temperature mechanical strength in an oxidizing environment, such as molten glass, and to cobalt-based alloys that can be used at high temperature, especially for producing articles for the hot smelting and/or conversion of glass or any other mineral material, such as components of machines for manufacturing mineral wool.

One fiberizing technique, called the internal centrifugation process, consists in letting liquid glass fall continuously into an assembly of axisymmetric parts rotating with a very high rotation speed about their vertical axis. One key part, called the "spinner", receives the glass against a wall called the "band" which is pierced by holes through which the glass flows under the effect of the centrifugal force, to escape from all parts thereof in the form of molten filaments. An annular burner located above the outside of the spinner, which produces a descending stream of gas hugging the outer wall of the band, deflects these filaments downward, attenuating them. The filaments then "solidify" in the form of glass wool.

The spinner is a fiberizing tool that is highly stressed thermally (heat shocks during startup and shutdown procedures, and, during steady use, a temperature gradient along the part), mechanically (centrifugal force, and erosion due to the flow of the glass) and chemically (oxidation and corrosion by the molten glass, and by the hot gases output by the burner around the spinner). Its main modes of deterioration are the following: hot creep deformation of the vertical walls; appearance of horizontal or vertical cracks; and erosive wear of the fiberizing orifices, which require, purely and simply, the replacement of the components. Their constituent material must therefore be resistant for a production time long enough to remain compatible with the technical and economic constraints of the process. For this purpose, materials endowed with a certain ductility, creep resistance and corrosion and/or oxidation resistance are sought.

Various known materials for producing these tools are nickel-based or cobalt-based superalloys strengthened by the precipitation of carbides. Particularly refractory alloys are based on chromium and cobalt, a refractory element that provides the matrix of the alloy with improved high-temperature intrinsic mechanical strength.

Thus, WO-A-99/16919 discloses a cobalt-based alloy having improved high-temperature mechanical properties, essentially comprising the following elements (in percentages by weight of the alloy):

| | |
|---|---|
| Cr | 26 to 34% |
| Ni | 6 to 12% |
| W | 4 to 8% |
| Ta | 2 to 4% |
| C | 0.2 to 0.5% |
| Fe | less than 3% |
| Si | less than 1% |
| Mn | less than 0.5% |
| Zr | less than 0.1%, | the balance consisting of cobalt and inevitable impurities, the tantalum/carbon molar ratio being around 0.4 to 1.

The selection of the carbon and tantalum contents is intended to form, in the alloy, a dense but discontinuous network of intergranular carbides consisting essentially of chromium carbides, in the form of $Cr_7C_3$ and $(Cr,W)_{23}C_6$, and tantalum carbides TaC. This selection gives the alloy improved high-temperature mechanical and oxidation resistance properties, allowing a molten glass whose temperature is 1080° C. to be fiberized.

Also known, from WO 01/90429, are cobalt-based alloys that can be employed at even higher temperatures, these alloys presenting a good compromise between mechanical strength and oxidation resistance above 1100° C., and advantageously above 1150° C., thanks to a microstructure whose intergranular zones are rich in tantalum carbide precipitates. On the one hand, these carbides act as a mechanical reinforcement, opposing intergranular creep at very high temperature, and, on the other hand, they have an effect on the oxidation behavior owing to their oxidation to $Ta_2O_5$, which forms oxides entirely filling the previous volume of TaC carbides, preventing the penetration of the aggressive medium (liquid glass, hot gas) into the intergranular spaces. A sufficient quantity of tantalum carbides is provided:

either with a moderate carbon content (about 0.3 to 0.55%, preferably about 0.35 to 0.5%, by weight of the alloy) combined with a sufficiently high tantalum content (Ta/C molar ratio not less than 0.9, and preferably about 1 to 1.2) suitable for promoting the formation of TaC carbides to the detriment of all other carbides;

or with a relatively high carbon content (around 0.8 to 1.2%, preferably around 0.9 to 1.1%) combined with a tantalum content such that the tantalum-to-carbon molar ratio Ta/C of less than 0.9 can then be as low as 0.3, preferably 0.35. The micro-structure then has a very dense network of intergranular carbides comprising $M_{23}C_6$ carbides which tend to dissolve as a solid solution at high temperature, above 1150° C., so as to leave only TaC at the grain boundaries.

In one example, the alloy is employed under industrial conditions for fiberizing a glass at a temperature of around 1200 to 1240° C. in the fiberizing spinner. This means that the temperature of the metal along the profile of the spinner is between 1160 and 1210° C. The lifetime of the spinner reached 390 hours.

In industrial production, in particular for fiberizing basaltic glass, it nevertheless appears to be preferable to provide mechanical strength for a metal temperature range above 1200° C., in order to have greater flexibility in adjusting the production conditions.

The object of the present invention is to provide further improved alloys, the high-temperature mechanical strength of which is higher, allowing work at a metal temperature of 1200° C. or higher.

In this regard, the subject of the invention is an alloy endowed with high-temperature mechanical strength in an oxidizing medium, said alloy being free of molybdenum and/or tungsten and comprising a chromium-containing matrix strengthened by precipitation of carbides, characterized in that it comprises carbides of at least one metal (M) chosen from titanium, zirconium and hafnium, said carbides optionally further containing tantalum (M'). The expression "free of Mo and/or W" is understood for the purpose of the present description to mean that the percentage weight content of each of these two elements in the alloy is less than 1%, typically less than 0.1%, and more particularly that each of these two elements is present in the form of undesirable impurities.

Specifically, the invention relies on the discovery that carbides of a metal other than tantalum have a very satisfactory reinforcing effect and can be used as a complete or partial substitution for tantalum carbide in order to improve the high-temperature performance of an especially refractory alloy.

These carbides of metals M selected according to the invention are characterized by a durability during long exposure (for a few hundred hours) to high temperature, whereas tantalum carbide under the same exposure conditions undergoes fragmentation, which disperses and rarifies the reinforcements in the material. Some of these carbides, initially of "hook-shaped" typical morphology, adopt a spherical geometry corresponding to the thermodynamically most stable state that minimizes the carbide/matrix interfacial energy. This fragmentation is accompanied by partial dissolution of the carbides in the matrix.

As indicated in WO 01/90429, the mechanical strength is the key factor in the lifetime of spinners for fiberizing temperatures as high as 1150-1200° C., and higher. Thus, the resistance at these temperatures of the reinforcing precipitates is decisive in determining the lifetime of the material.

Zirconium, hafnium and titanium carbides provide a very appreciable improvement from the standpoint of high-temperature mechanical strength.

Very surprisingly, the inventors have also found that mixed carbides, containing tantalum in addition to the other metal M among Ti, Hf and Zr, are very temperature-stable, more than carbides containing only tantalum, and more than carbides containing only the other metal if the latter is Ti or Zr. The expression "stability with respect to high temperatures" is understood here to mean retention of the carbide morphology, generally of "script" structure. This embodiment constitutes one most particularly preferred version of the invention as the alloys that result therefrom also demonstrate better oxidation resistance.

However, hafnium carbide HfC is even more stable than the other carbides MC and more stable than the carbides (Ta,M)C. This embodiment is also advantageous.

These mixed carbides have an improved high-temperature microstructure—less fragmentation and less rarefaction of the (Ta,M)C carbides. Better still, the addition of Ti to the TaC carbides stabilizes the latter at high temperature to such a point that fine secondary (Ta,Ti)C carbides, very useful for intragranular creep resistance, spontaneously precipitate in the matrix (whereas in general secondary precipitates obtained by special heat treatment have more a tendency to disappear under the same conditions). This high-temperature stability makes these (Ta,Ti)C carbides particularly advantageous, although they have a slightly different morphology from the MC carbides.

It is advantageous to favor the MC or (Ta,M)C carbides as sole hardening phase, by maintaining a ratio of the atomic content of metal (or the sum of the metals) with the atomic content of carbon close to 1, but which may be higher, especially around 0.9 to 2. In particular, a slight difference, to below unity, remains permissible in the sense that the few additional carbides that could be generated (chromium carbides) do not impair the set of properties at all temperatures. An advantageous ratio range is 0.9 to 1.5.

The quantity of MC or (Ta,M)C carbides must be sufficient for good high-temperature mechanical behavior. To achieve this, the carbon content, (which is therefore related to that of the metal) must be quite high, for example 0.6 wt %. However, the carbon content may be as low as 0.2% while maintaining a good part of the hot mechanical strength potential.

Preferred alloys according to the invention have a matrix based on cobalt or nickel or iron-nickel. Particularly preferred is a cobalt-based matrix which guarantees both a sufficiently high solidus temperature and good high-temperature oxidation behavior. In these alloys, the microstructure is formed from a dendritic matrix of cobalt crystallized with a face-centered cubic lattice and from a eutectic two-phase (Co matrix/carbides) compound present in the interdendritic spaces. The morphology of this eutectic consists of an intimate entanglement of carbides and matrix. The very good intergranular cohesion provided by this eutectic is highly favorable to very good mechanical strength at very high temperature.

In particular, a subject of the invention is a cobalt-based alloy, also containing chromium, nickel and carbon, which is essentially composed of the following elements (the proportions being indicated in percentages by weight of the alloy):

| | |
|---|---|
| Cr | 23 to 34% |
| Ni | 6 to 12% |
| M = Zr, Hf or Ti | 0.2 to 7% |
| M' = Ta | 0 to 7% |
| C | 0.2 to 1.2% |
| Fe | less than 3% |
| Si | less than 1% |
| Mn | less than 0.5%, | the balance consisting of cobalt and inevitable impurities.

Chromium contributes to the intrinsic mechanical strength of the matrix in which it is partly present in solid solution and, in certain cases, also in the form of carbides essentially of the $Cr_{23}C_6$ type with a fine dispersion within the grains, where they provide intragranular creep resistance or in the form of carbides of the $Cr_7C_3$ or $Cr_{23}C_6$ type present at the grain boundaries, which carbides prevent grains from slipping past one another, and thus also contributing to the intergranular strengthening of the alloy. Chromium also contributes to the corrosion resistance, as precursor of chromium oxide that forms a protective layer on the surface exposed to the oxidizing medium. A minimum quantity of chromium is needed to form and maintain this protective layer. However, too high a chromium content is deleterious to both mechanical strength and toughness at high temperatures, as it results in too high a stiffness and too low an elongatability under stress that are incompatible with the high-temperature constraints.

In general, the chromium content of an alloy according to the invention that can be used will be from 23 to 34% by weight, preferably around 26 to 32% by weight, and advantageously about 28 to 30% by weight.

Nickel, present in the alloy in the form of a solid solution as element stabilizing the crystalline cobalt structure, is used within the usual range of contents of around 6 to 12%, advantageously 8 to 10%, by weight of the alloy.

Carbon is an essential constituent of the alloy, needed to form metal carbide precipitates.

The carbon content directly determines the quantity of carbides present in the alloy. It is at least 0.2% in order to obtain the desired minimum reinforcement, but limited to at most 1.2% in order to prevent the alloy from becoming hard and difficult to machine because of too high a density of reinforcements. The lack of ductility of the alloy at such contents prevents an imposed deformation (for example of thermal origin) from being accommodated without fracturing and prevents it from being sufficiently resistant to crack propagation.

The selected carbide-forming elements according to the invention have the advantages explained below.

Since titanium is a more standard and less expensive element than tantalum, it therefore has less of an adverse effect on the cost of the alloy than tantalum in known alloys. The fact that this element is a light element may also be advantageous.

A minimum quantity of titanium of 0.2 to 5% by weight of the alloy seems preferable for producing a sufficient quantity of TiC carbides, certainly because of the solubility of titanium in the fcc cobalt matrix. A titanium content of around 0.5 to 4%, especially 0.6 to 3%, seems advantageous.

Zirconium and hafnium provide the cobalt-based alloys reinforced by ZrC or HfC eutectic carbides good refractoriness with a solidus temperature that may be above 1300° C. They are also endowed with very good stability at high temperature, even at temperatures such as 1300° C., and for times of several tens or hundreds of hours, with a more limited fragmentation/rarefaction phenomenon in these carbides than that which impairs the mechanical properties of the alloys reinforced by TaC carbides.

The quantity of zirconium in the alloy may be from 0.2 to 5%, advantageously 0.4 to 3%, and especially 0.5 to 1.5%.

Hafnium appears as a very powerful carbide-forming element, which produces, for the same atomic content, a more dense carbide network than tantalum. This is certainly due to the fact that the enthalpy of formation of HfC carbides is lower. They therefore form in larger quantity, hafnium also being completely absent from the composition of the matrix.

The quantity of hafnium may be from 0.2 to 7%, preferably around 0.2 to 5%, in particular 0.4 to 5%, and especially about 1.5 to 4.5%.

HfC carbides are very stable and do not change after long periods of exposure (beyond 100 hours) at 1200° C.—neither fragmentation nor dissolution in the matrix is observed.

To have an acceptable microstructure in an alloy reinforced with HfC carbides, it seems preferable to have an Hf/C ratio of less than 1, or in certain cases close to 0.5. The same comment may be made in respect of the oxidation resistance.

Another major benefit of these alloys is there refractoriness—the gain over an alloy reinforced with TaC may be up to 40° C. in respect of the onset of melting of the alloy.

As mentioned above, mixed carbides in which tantalum is replaced with Zr or Ti demonstrate improved high-temperature stability and those where Ta is replaced with Hf demonstrate excellent high-temperature stability.

Tantalum, optionally present in the alloy, is partly in solid solution in the cobalt matrix, in which this heavy atom locally distorts the crystal lattice and impedes, or even pins, the movement of dislocations when the material is under a mechanical load, thus contributing to the intrinsic strength of the matrix. The minimum tantalum content allowing formation of mixed carbides with the metal M according to the invention is around 0.5%, preferably around 1% and very preferably around 1.5%, or even 2%. The upper limit of the tantalum content may be chosen to be about 7%. The tantalum content is preferably around 2 to 6%, in particular 1.5 to 5%. The tantalum content is very preferably less than 5%, or 4.5% or even 4%. A small quantity of tantalum has two advantages—it substantially reduces the overall cost of the alloy and also makes machining of said alloy easier. The higher the tantalum content, the harder the alloy is, that is to say the more difficult it is to form.

When the alloy contains tantalum and zirconium simultaneously, it appears preferable to keep the zirconium content quite low, so that it acts as a replacement for a small part of the tantalum.

The alloy may contain other usual constituent elements or inevitable impurities. In general, it comprises:
  silicon, as deoxidizing agent for the molten metal during smelting and casting of the alloy, in an amount of less than 1% by weight;
  manganese, also a deoxidizing agent, in an amount of less than 0.5% by weight; and
  iron, in a content of possibly up to 3% by weight without impairing the properties of the material,
  the cumulative quantity of the other elements introduced as impurities with the essential constituents of the alloy ("inevitable impurities") advantageously representing less than 1% by weight of the composition of the alloy.

The alloys according to the invention are preferably free of Ce, La, B, Y, Dy, Re and other rare earths.

The alloys that can be used according to the invention, which contain highly reactive elements, may be formed by casting, especially by inductive melting in an at least partly inert atmosphere, and by sand mold casting.

The casting may optionally be followed by a heat treatment at a temperature that may be above the fiberizing temperature.

The subject of the invention is also a process for manufacturing an article by casting using the alloys described above as subject matter of the invention.

The process may include at least one cooling step, after the casting and/or after or during a heat treatment, for example by air cooling, especially with a return to room temperature.

The process may further include a forging step after casting.

The alloys according to the invention may be used to manufacture all kinds of parts that are mechanically stressed at high temperature and/or required to operate in an oxidizing or corrosive medium. The subject of the invention is also such articles manufactured from an alloy according to the invention, especially by casting.

Among such applications, mention may in particular be made of the manufacture of articles that can be used for the hot smelting or conversion of glass, for example fiberizing spinners for the manufacture of mineral wool.

Another subject of the invention is therefore a process for manufacturing mineral wool by internal centrifugation, in which a stream of molten mineral material is poured into a fiberizing spinner, the peripheral band of which is pierced by a multitude of orifices via which filaments of molten mineral material escape that are then attenuated through the action of a gas into wool, characterized in that the temperature of the mineral material in the spinner is at least 1200° C. and in that the fiberizing spinner is made of an alloy as defined above.

The alloys according to the invention therefore make it possible to fiberize glass, or a similar molten mineral composition, having a liquidus temperature $T_{liq}$ of around 1130° C. or higher, for example 1130 to 1200° C., especially 1170° C. or higher.

In general, these molten mineral compositions may be fiberized within a temperature range (for the molten composition reaching the spinner) of between $T_{liq}$ and $T_{log2.5}$ where $T_{log2.5}$ is the temperature at which the molten composition has a viscosity of $10^{2.5}$ poise (dPa·s), typically around 1200° C. or higher, for example 1240 to 1250° C. or higher.

Among these mineral compositions, it may be preferred to have compositions containing a significant quantity of iron, which compositions are less corrosive with respect to the constituent metal of the fiberizing members.

Thus, the process according to the invention advantageously uses a composition of mineral material that is oxidizing in particular with respect to chromium, capable of repairing or reconstituting the protective $Cr_2O_3$ oxide layer established on the surface. In this regard, it may be preferred to use compositions containing iron essentially in ferric form (the oxide $Fe_2O_3$), especially with a molar ratio of the II and III oxidation states, expressed by the $$\frac{FeO}{FeO + Fe_2O_3}$$

ratio of around 0.1 to 0.3, especially 0.15 to 0.20.

Advantageously, the mineral composition has a high iron content allowing a rapid rate of reconstitution of chromium oxide with an amount of iron oxide (an amount called "total iron", corresponding to the total iron content conventionally expressed in equivalent $Fe_2O_3$ form) of at least 3%, preferably at least 4%, especially around 4 to 12%, in particular at least 5%. Within the above redox range, this corresponds to a content of ferric iron $Fe_2O_3$ alone of at least 2.7%, preferably at least 3.6%.

Such compositions are known, in particular from WO-99/56525, and advantageously comprise the following constituents:

| | |
|---|---|
| $SiO_2$ | 38-52%, preferably 40-48% |
| $Al_2O_3$ | 17-23% |
| $SiO_2 + Al_2O_3$ | 56-75%, preferably 62-72% |
| RO (CaO + MgO) | 9-26%, preferably 12-25% |
| MgO | 4-20%, preferably 7-16% |
| MgO/CaO | ≥0.8, preferably ≥1.0 or ≥1.15 |
| $R_2O(Na_2O + K_2O)$ | ≥2% |
| $P_2O_5$ | 0-5% |
| Total iron ($Fe_2O_3$) | ≥1.7%, preferably ≥2% |
| $B_2O_3$ | 0-5% |
| MnO | 0-4% |
| $TiO_2$ | 0-3%. |

Other compositions known from WO-00/17117 prove to be particularly appropriate for the process according to the invention.

They are characterized by the following percentage contents by weight:

| | |
|---|---|
| $SiO_2$ | 39-55%, preferably 40-52% |
| $Al_2O_3$ | 16-27%, preferably 16-25% |
| CaO | 3-35%, preferably 10-25% |
| MgO | 0-15%, preferably 0-10% |
| $Na_2O$ | 0-15%, preferably 6-12% |
| $K_2O$ | 0-15%, preferably 3-12% |
| $R_2O$ ($Na_2O + K_2O$) | 10-17%, preferably 12-17% |
| $P_2O_5$ | 0-3%, preferably 0-2% |
| Total iron ($Fe_2O_3$) | 0-15%, preferably 4-12% |
| $B_2O_3$ | 0-8%, preferably 0-4% |
| $TiO_2$ | 0-3%, |

MgO being between 0 and 5%, especially between 0 and 2% when $R_2O \leq 13.0\%$.

According to one embodiment, the compositions possess iron oxide contents of between 5 and 12%, especially between 5 and 8%. This makes it possible to achieve a fire resistance of the mineral wool blankets.

Although the invention has been described mainly within the context of the manufacture of mineral wool, it may be applied to the glass industry in general for producing furnace components or accessories, bushings, or feeders, especially for the production of textile glass (yarn or strand) and packaging glass.

Outside the glass industry, the invention may apply to the manufacture of a very wide variety of articles when these have to have high mechanical strength in an oxidizing and/or corrosive medium, in particular at high temperature.

In general, these alloys may be used to produce any type of fixed or moving part made of refractory alloy for the operation or running of a high-temperature (above 1200° C.) heat treatment furnace, a heat exchanger or a reactor in the chemical industry. Thus, it may for example be used for hot fan blades, firing supports, furnace-charging equipment, etc. They may also be used to produce any type of resistance heating element intended to operate in a hot oxidizing atmosphere, and to produce turbine components used in engines of land, sea or air transport vehicles, or in any other application not involving vehicles, for example power stations.

Thus, a subject of the invention is the use in an oxidizing atmosphere at a temperature of at least 1200° C. of an article made of an alloy as defined above.

The invention is illustrated by the following examples and FIGS. 1 to 3 of the appended drawings in which.

Firstly, the cobalt-based alloys reinforced by carbides containing only a metal M are illustrated.

These examples 1 to 5 are given in Table 1 below (the contents being in wt %):

TABLE 1

| Ex. | Co | Ni | Cr | C | Hf | Ti | Zr |
|---|---|---|---|---|---|---|---|
| 1 | Base | 8.7 | 28.4 | 0.4 | 6 | — | — |
| 2 | Base | 8.7 | 28.4 | 0.4 | 3 | — | — |
| 3 | Base | 8.7 | 28.4 | 0.4 | — | 1.6 | — |
| 4 | Base | 8.7 | 28.4 | 0.4 | — | 3 | — |
| 5 | Base | 8.7 | 28.4 | 0.4 | — | — | 3 |

The microstructure of these alloys containing niobium, zirconium or hafnium carbides is visually very close to that of a similar alloy containing tantalum carbides (the comparative alloy defined below). These elements form eutectic carbides of "script" morphology a priori favorable to good intergranular cohesion.

When the alloys of Examples 1 and 2 are exposed to a temperature of 1200° C. for a long time, typically 100 hours, their microstructures remain practically undisturbed and the carbides can therefore continue to act as reinforcements. In addition to this micro-structural stability, these alloys have a network of carbides with a density similar to that of the comparative alloy, while introducing less carbide-forming elements. Furthermore, a substantial increase in refractoriness is observed—the onset of melting of the alloy of Example 1 is 1374° C. and that of Example 2 is 1380° C., compared to 1338° C. in the case of the comparative alloy.

As regards the alloys of Examples 3 and 4 containing titanium carbides, the microstructures obtained are also satisfactory, the TiC carbides seeming to be capable of good intergranular cohesion thanks to their script geometry entirely comparable to that of the TaC carbides of the comparative alloy. The microstructure is quite stable with, in the case of Example 4 in which the Ti/C atomic ratio is greater than 1, lower rarefaction of the carbides than that of the TaC carbides of the comparative alloy.

The alloy of Example 5 is also characterized by a certain microstructural stability after 100 h at 1200° C., however a little less than that of the alloys of Examples 1 and 2.

Secondly, the cobalt-based alloys reinforced by carbides containing simultaneously titanium and tantalum are illustrated.

Figure 1:
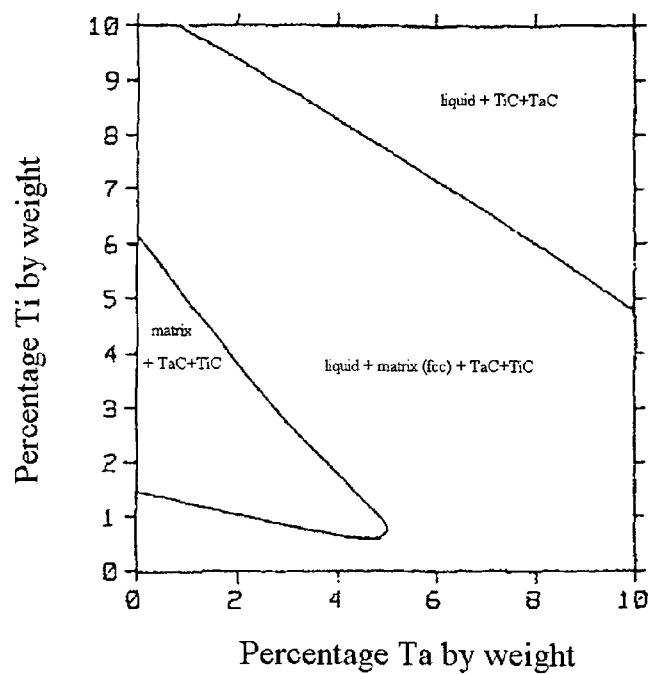
FIG. 1 shows a phase diagram for a family of alloys according to the invention.

Phase diagrams for the system, one of which is illustrated in FIG. 1, were determined from experimental and modeling data. The diagram shows, for a given temperature (1300° C. isothermal cut), the phases that would be observed as a function of the titanium and tantalum mass contents in cobalt/TaTiC-based alloys (the composition of which always contains the following elements in wt %: Cr=28.34; Ni=8.68; C=0.4). The object is to determine the concentration ranges of these two metals which give the highest possible solidus temperature for the material. This diagram shows a very restricted entirely solid (matrix+TaC+TiC) range. The following examples in this compositional range were chosen.

EXAMPLE 6

An alloy of the following composition was prepared:

| | |
|---|---|
| Cr | 28.4% |
| Ni | 8.7% |
| C | 0.4% |
| Ti | 1.5% |
| Ta | 3% | with the following residual elements:

| | |
|---|---|
| Fe | <3% |
| Si | <1% |
| Mn | <0.5% |
| Zr | <0.1% |
| total others | <1% | the balance consisting of cobalt.

The thermal stability of this microstructure was demonstrated by the following treatment:

an alloy specimen was heated for 100 hours at a temperature of 1200° C., after which it was quenched in water in order to "freeze" the microstructure.

The structure of the specimen was observed using a scanning electron microscope. This observation showed that the structure of the grain boundaries contains (Ta,Ti)C carbides distributed in a dense network and also revealed the precipitation in the matrix of fine secondary (Ta,Ti)C carbides, very useful for resistance to intragranular creep. This microstructure was not affected by exposure to high temperature (100 h at 1200° C.)—the TaC carbides containing titanium were perfectly stable, more so than the TaC carbides of the alloy reinforced by tantalum carbides of the comparative example. These TaC carbides containing Ti constituting most of the carbides had an almost undisturbable microstructure at high temperature—very little fragmentation and rarefaction of the (Ta,Ti)C carbides.

Tests demonstrated the very high refractoriness of these carbides, the solidus temperature of which was in the region of 1350° C.

Figure 3:
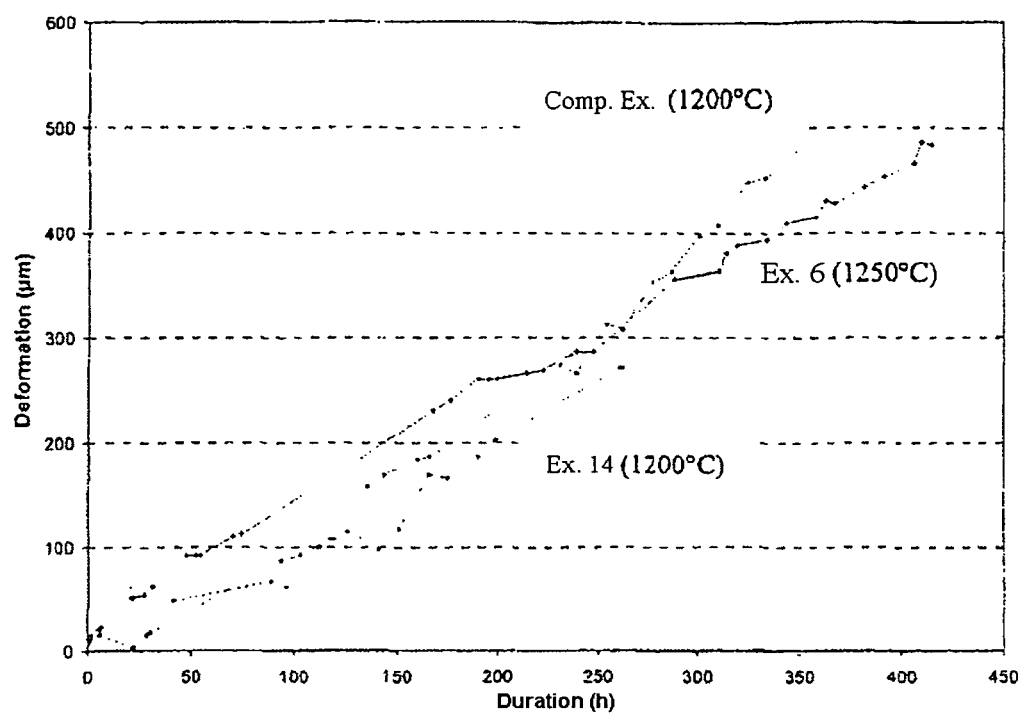
FIG. 3 is a graph illustrating the comparative mechanical properties of various alloys.

The high-temperature mechanical resistance properties of the alloy were evaluated in three-point bending creep resistance tests at a temperature of 1250° C. under a load of 31 MPa. The tests were carried out on a parallelepipedal test piece 30 mm in width and 3 mm in thickness, the load being exerted midway between the supports that were 37 mm apart. The deformation of the test piece was monitored as a function of time, as shown in the graph of FIG. 3. The mechanical resistance is generally expressed by the creep rate.

The alloy deformed at a sag rate of 1.1 µm/h, compared with 3.5 µm/h for the 100% TaC alloy of the comparative example.

The oxidation resistance properties were evaluated in thermogravimetric tests at 1200° C. A parabolic oxidation constant $K_p$ of $190 \times 10^{-12}$ $g^2 \cdot cm^{-4} \cdot s^{-1}$, compared with $96.5 \times 10^{-12}$ $g^2 \cdot cm^{-4} \cdot s^{-1}$ for the alloy of the comparative example, was obtained.

The oxidation behavior is degraded relatively little compared with the comparative alloy, to an extent that is not detrimental in this temperature range, in which it is the mechanical resistance that determines the quality of the material. The balance between these two properties is therefore here largely in favor of the alloy of Example 6.

EXAMPLE 7

Another alloy of the same type was prepared with a composition differing from that of Example 6 as indicated in Table 2.

TABLE 2

| (contents in wt %) | | | | | | |
|---|---|---|---|---|---|---|
| Ex. | Co | Ni | Cr | C | Ti | Ta |
| 6 | bal. | 8.7 | 28.3 | 0.4 | 1.5 | 3 |
| 7 | bal. | 8.7 | 28.3 | 0.4 | 1 | 4 |

The microstructure of Example 7 is similar to that of Example 6.

The high-temperature mechanical resistance properties of the alloy were evaluated in three-point bending creep resistance tests at a temperature of 1250° C. under a load of 31 MPa, as previously. The creep rate was 3.2 µm/h, already representing a 10% reduction over the alloy of the comparative example.

The oxidation behavior of this Example 7, monitored by thermogravimetry, proceeded barely faster than in the case of the alloy of the comparative example, with a parabolic constant $K_p=136 \times 10^{-12}$ $g^2 \cdot cm^{-4} \cdot s^{-1}$ over 100 hours at 1200° C. compared with $96.5 \times 10^{-12}$ $g^2 \cdot cm^{-4} \cdot s^{-1}$ in the case of the alloy of the comparative example.

Thermogravimetric tests carried out at 1300° C. showed the persistence of healthy oxidation behavior again with a parabolic law and constants increased by a factor of 6, which is very reasonable for a test temperature lying just a few tens of degrees below the solidus.

These alloys 6 and 7 were also tested in cyclic oxidation in air. These tests consisted of 10 cycles each formed from a rise up to 1200° C., followed by a hold for 24 hours and then air cooling and weighing of the specimen, with calculation of the weight loss per unit area. Alloys 6 and 7 behaved almost as well as the alloy of the comparative example.

COMPARATIVE EXAMPLE

The alloy of Example 1 of WO 01/90429, having the following composition, was reproduced:

| | |
|---|---|
| Cr | 28.3% |
| Ni | 8.68% |
| C | 0.37% |
| Ta | 5.7% |
| W | 0% |

Residual elements:

| | |
|---|---|
| Fe | <3% |
| Si | <1% |
| Mn | <0.5% |
| Zr | <0.1% |
| total others | <1%, | the balance consisting of cobalt.

This alloy was characterized by reinforcement by an intergranular phase composed exclusively of tantalum carbides.

The mechanical resistance is illustrated in FIG. 3, in which the deformation of the alloy in three-point creep under 31 MPa at a temperature of 1200° C. is shown. The behavior is similar to that obtained with the alloy of Example 6, but at a temperature of 1250° C. in the case of the latter.

Next, the cobalt-based alloys reinforced by carbides containing both zirconium and tantalum are illustrated.

Figure 2:
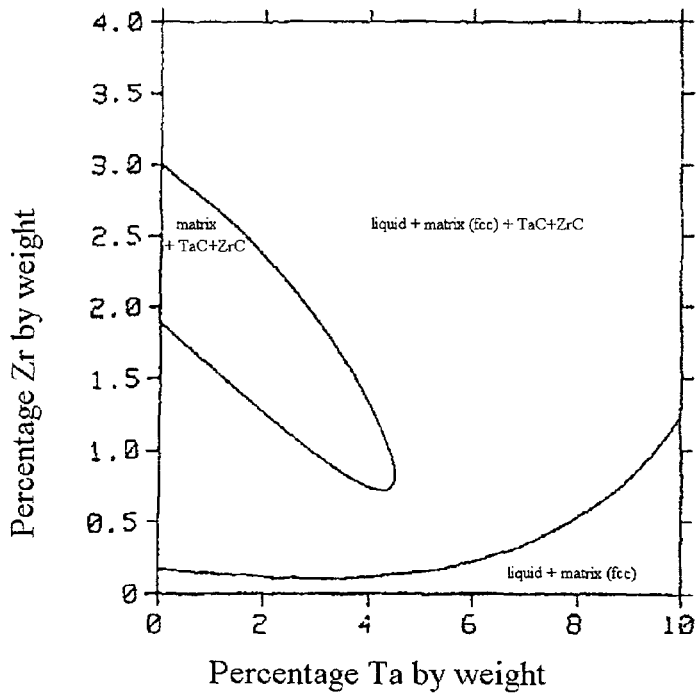
FIG. 2 shows a phase diagram for a family of alloys according to the invention.

Phase diagrams for the system, one of which is illustrated in FIG. 2, were determined from experimental and modeling data. The diagram shows, for a given temperature (1300° C. isothermal cut), the phases that would be observed as a function of the tantalum and zirconium mass contents in cobalt/TaZrC-based alloys (the composition of which always contains the following elements in wt %: Cr=28.34; Ni=8.68; C=0.4). The object was to determine the concentration ranges of these two metals giving the highest possible solidus temperature for the material. This diagram reveals a very restricted entirely solid (matrix+TaC+ZrC) range. The following examples were chosen in this compositional range.

EXAMPLES 8 TO 12

The tests carried out on the various alloys produced, Table 3 below giving their chemical compositions, showed that the advantages owing to the ZrC carbides (refractoriness and excellent microstructural stability) are thus combined with those owing to the TaC carbides (lower production cost and excellent high-temperature oxidation properties).

TABLE 3

| | | | | | | |
|---|---|---|---|---|---|---|
| | (contents in wt %) | | | | | |
| Ex. | Co | Ni | Cr | C | Zr | Ta |
| 8 | bal. | 8.7 | 28.4 | 0.4 | 2 | 2 |
| 9 | bal. | 8.7 | 28.4 | 0.4 | 1.5 | 3 |
| 10 | bal. | 8.7 | 28.4 | 0.4 | 1 | 4 |

TABLE 3-continued

| | | | | | | |
|---|---|---|---|---|---|---|
| | (contents in wt %) | | | | | |
| Ex. | Co | Ni | Cr | C | Zr | Ta |
| 11 | bal. | 8.7 | 28.4 | 0.37 | 0.5 | 5.8 |
| 12 | bal. | 8.7 | 28.4 | 0.37 | 0.5 | 5.0 |

The refractoriness of these alloys was tested by DTA (differential thermal analysis) so as to be able to compare it with that of the comparative example. The onset of melting of the alloys is in general at least 1350° C., in particular 1366° C. in the case of the alloy of Example 8, compared with 1340° C. in the case of the comparative example.

The microstructure of these alloys is advantageous.

Greater structural stability of the alloy of Example 11 than of the comparative alloy was noted—again carbide entanglement was observed after 100 hours at 1200° C.

For example, the alloy of Example 11 had a dense interdendritic network of mixed ZrC—TaC carbides which was more stable and fragmented less, even over 100 hours at 1200° C.—a guarantee of better mechanical behavior—and oxidation behavior equivalent to that of the alloy of the comparative example ($K_p=93.6\times10^{-12}$ g$^2$·cm$^{-4}$·s$^{-1}$ over 100 hours at 1200° C., as opposed to $96.5\times10^{-12}$ g$^2$·cm$^{-4}$·s$^{-1}$ in the case of the TaC-reinforced alloy).

Finally, the cobalt-based alloys reinforced by carbides containing both hafnium and tantalum are illustrated.

EXAMPLES 13 TO 15

TABLE 4

| | | | | | | |
|---|---|---|---|---|---|---|
| | (contents in wt %) | | | | | |
| Ex. | Co | Ni | Cr | Ta | Hf | C |
| 13 | Bal. | 8.7 | 28.4 | 2 | 4 | 0.4 |
| 14 | Bal. | 8.7 | 28.4 | 3 | 3 | 0.4 |
| 15 | Bal. | 8.7 | 28.4 | 4 | 2 | 0.4 |

These alloys have (Hf+Ta)/C ratios equal to 1.

The carbide network obtained for these three alloys had an advantageous morphology, the more so as the quantity of hafnium was higher than that of tantalum.

Very good structural stability was observed in the case of these alloys. The carbide network appeared to be intact after 100 hours at 1200° C.

The refractoriness of these alloys was tested by DTA so as to be able to compare it with that of the comparative example. The onset of melting of the alloy of Example 13 was thus 1382° C. and that of Example 14 was 1366° C., compared to 1340° C. for the comparative example. The fact of substituting half the tantalum with hafnium therefore increases its melting onset by at least 26° C., which is not insignificant.

The high-temperature mechanical resistance properties of the alloy of Example 14 were evaluated in three-point bending creep resistance tests at a temperature of 1200° C. under a load of 31 MPa. The results are given in FIG. 3.

Although the behavior of the alloy is close to that of the comparative example in the first part of the test, it may be noted that the deformation curve then departs substantially from the curve followed by the alloy of the comparative example.

The invention claimed is:

1. An alloy comprising a chromium-containing matrix strengthened by precipitation of carbides, wherein said alloy comprises carbides of titanium and carbides of tantalum, wherein the alloy consists essentially of the following elements (the proportions being indicated in percentages by weight of the alloy):

| | |
|---|---|
| Cr | 23 to 34%; |
| Ni | 6 to 12%; |
| Ti | 0.5 to 5%; |
| Ta | 0.5 to 7%; |
| C | 0.2 to 1.2%; |
| Fe | less than 3%; |
| Si | less than 1%; |
| Mn | less than 0.5%, | the balance consisting of cobalt and impurities, and wherein the alloy has a microstructure comprising grain boundaries that comprise the carbides of titanium and of tantalum in a dense network, the microstructure further comprising fine secondary carbides of titanium and of tantalum,
wherein the microstructure remains stable after exposure at 1200° C. for 100 hours.

2. The alloy as claimed in claim 1, which comprises titanium, and tantalum, in a metal/carbon molar ratio (Ti+Ta)/C of 0.9 to 2.

3. The alloy as claimed in claim 1, which comprises 0.6 to 5% titanium by weight.

4. The alloy as claimed in claim 1, which comprises 0.6 to 4% titanium by weight.

5. The alloy as claimed in claim 1, wherein the tantalum content is 1 to 7% by weight.

6. The alloy as claimed in claim 1, which comprises at least 0.6% carbon by weight.

7. The alloy as claimed in claim 1, which comprises titanium, and tantalum, in a metal/carbon molar ratio (Ti+Ta)/C of 0.9 to 1.5.

8. The alloy as claimed in claim 1, which comprises 0.6 to 3% titanium by weight.

9. The alloy as claimed in claim 1, which further comprises zirconium.

10. The alloy as claimed in claim 1, wherein the tantalum content is 2 to 6% by weight.

11. The alloy as claimed in claim 1, wherein the tantalum content is 1.5 to less than 5% by weight.

12. The alloy as claimed in claim 1, wherein the alloy contains less than 1% tungsten and less than 1% molybdenum by weight.

13. The alloy as claimed in claim 12, wherein the alloy is free of tungsten or molybdenum.

14. The alloy as claimed in claim 1, wherein the alloy contains less than 0.1% tungsten and less than 0.1% molybdenum by weight.

15. The alloy as claimed in claim 13, wherein the alloy is free of tungsten and molybdenum.

16. The alloy of claim 1, wherein the alloy has a sag rate of less than 3.5 µm/h in a three-point bending creep resistance test at a temperature of 1250° C. under a load of 31 MPa,
wherein the three-point bending creep resistance test is a test on a parallelepipedal test piece 30 mm in width and 3 mm in thickness, wherein the load of 31 MPa is exerted midway between supports that are 37 mm apart.

17. An article for the hot smelting or conversion of glass, the article comprising an alloy as claimed in claim 1.

18. The article as claimed in claim 17, which has undergone a forging operation after the alloy has been cast.

19. The article as claimed in claim 17, which consists of a fiberizing spinner for the manufacture of mineral wool.

20. A process for manufacturing an article as claimed in claim 17, comprising the casting of the molten alloy in a suitable mold.

21. A process for manufacturing mineral wool by internal centrifugation, in which a stream of molten mineral material is poured into a fiberizing spinner, the peripheral band of which is pierced by a multitude of orifices via which filaments of molten mineral material escape that are then attenuated through the action of a gas into wool, wherein the temperature of the mineral material in the spinner is at least 1200° C. and the fiberizing spinner comprises a cobalt-based alloy as claimed in claim 1.

22. The process as claimed in claim 21, wherein the molten mineral material has a liquidus temperature of around 1130° C. or higher.

\* \* \* \* \*